March 24, 1970     H. J. SCHERR     3,502,894
ANGLE MEASURING PHOTOELECTRIC TRANSDUCER WITH TWO PHOTOCELLS
AND ELECTROLUMINESCENT SOURCE OF LIGHT
Filed May 16, 1968     2 Sheets-Sheet 1
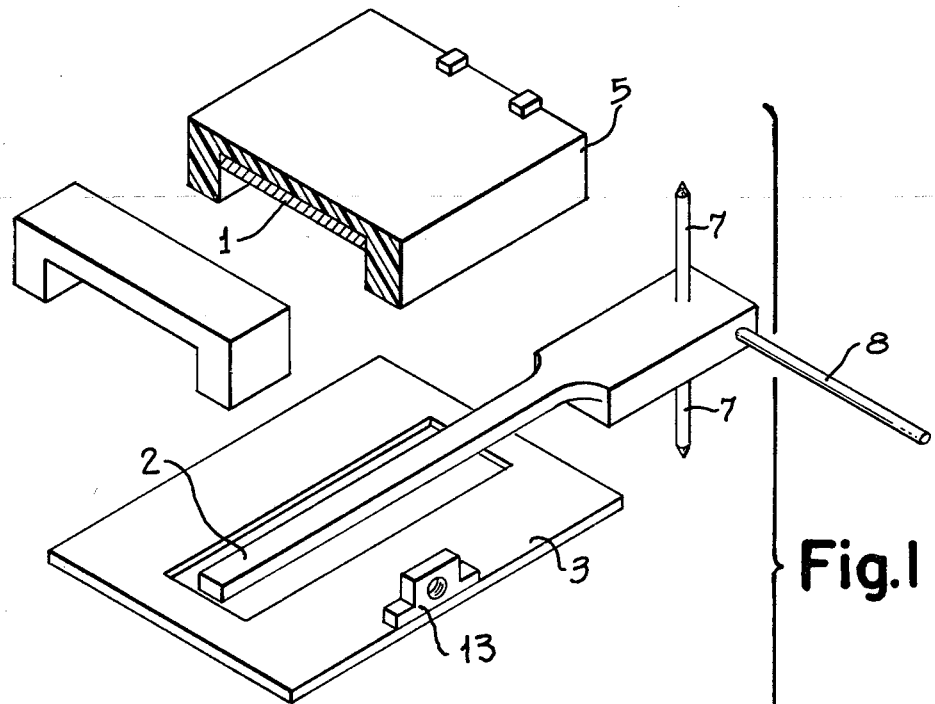
Fig.1
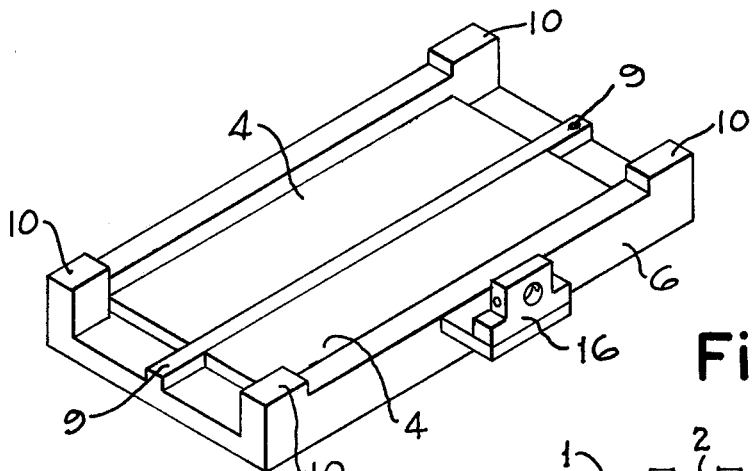
Fig.2
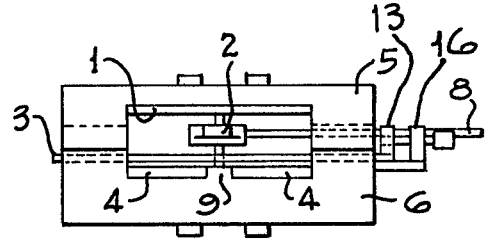
INVENTOR
HENRY J. SCHERR
BY   R. Hoffman
ATTORNEY March 24, 1970  H. J. SCHERR  3,502,894
ANGLE MEASURING PHOTOELECTRIC TRANSDUCER WITH TWO PHOTOCELLS
AND ELECTROLUMINESCENT SOURCE OF LIGHT
Filed May 16, 1968  2 Sheets-Sheet 2
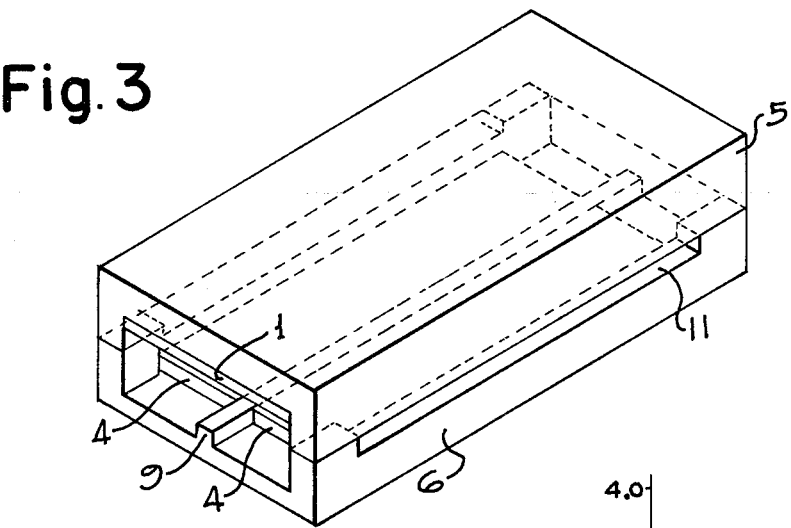
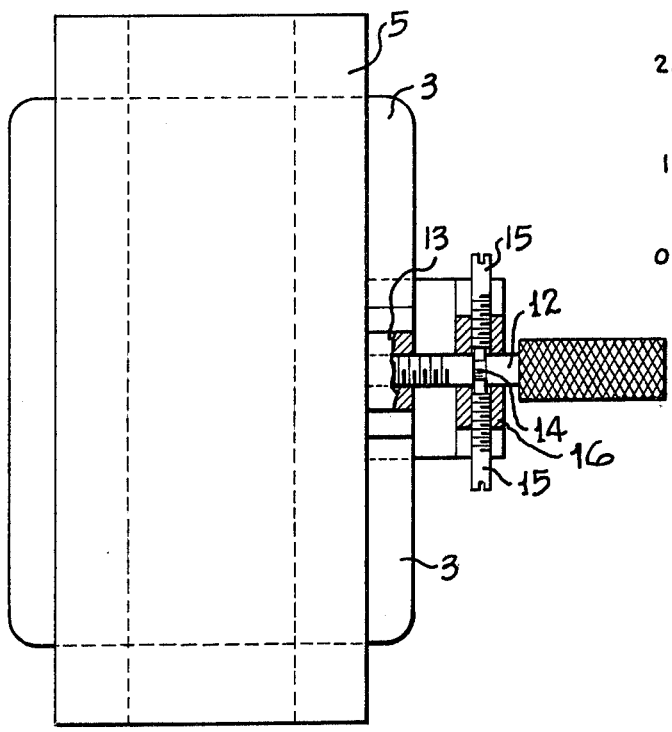
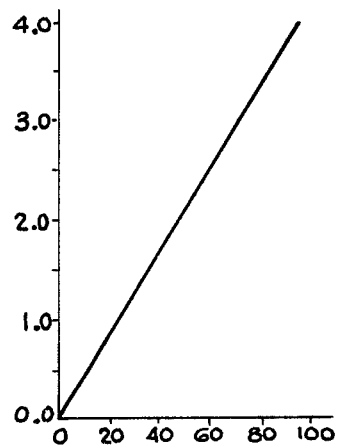
INVENTOR
HENRY J. SCHERR
BY
R. Hoffman
ATTORNEY United States Patent Office 3,502,894
Patented Mar. 24, 1970

3,502,894
ANGLE MEASURING PHOTOELECTRIC TRANS-
DUCER WITH TWO PHOTOCELLS AND ELEC-
TROLUMINESCENT SOURCE OF LIGHT
Henry J. Scherr, Philadelphia, Pa., assignor to the United
States of America as represented by the Secretary of
Agriculture
Filed May 16, 1968, Ser. No. 729,602
Int. Cl. G01b 11/26
U.S. Cl. 250—231                              4 Claims

ABSTRACT OF THE DISCLOSURE

A photoelectric transducer for measuring small angles and linear distances having two photocells connected in a current balancing circuit and a novel source of area illumination, an electroluminescent panel. The electrical output is a function of the differential illuminance of the photocells resulting from occlusion of the extended area light source by a pivoted vane between the light source and the photocells.

---

A non-exclusive, irrevocable, royalty-free license in the invention herein described, throughout the world for all purposes of the United States Government, with the power to grant sublicenses for such purposes is hereby granted to the Government of the United States of America.

This invention relates to a device for measuring small angles and small linear distances. More specifically it relates to a photoelectric transducer which uses a novel source of area illumination, an electroluminescent panel and a novel principle of operation, differential illuminance.

A number of excellent photoelectric transducers using area illumination have been designed for measuring extremely small angles. However, these transducers use a tungsten filament lamp as a light source. Consequently, the light source is separated from the photosensitive element by several inches because of the necessity to optically transform the filament configuration into an extended area light source outside the glass envelope.

With an electroluminescent panel, an extended area light source (light-emitting area) of great uniformity, reasonable stability and great adaptability is obtained directly. Although it may seem that the intensity of light from an electroluminescent source would be so low that it would seriously affect the sensitivity of a transducer, the ability of an electroluminescent panel to produce light without heat allows placing the photosensitive element close to the light source thereby taking advantage of the inverse square law to increase the illuminance of the photosensitive surface. Since an electroluminescent light source does not convert electricity into heat as in incandescent bulbs, nor into ultra-violet energy as in fluorescent tubes, but converts electrical energy directly into light, it will not produce atmospheric convection currents nor adverse affects from heat radiation or conduction. When operated at 40 Hz. and 156 volts, an electroluminescent panel with peak spectral response at 510 millimicrons had a luminance of 14 foot-candles at a distance of three-eigths of an inch. This is more than enough light to generate power in a properly loaded selenium photovoltaic cell with peak response to 560 millimicrons.

Light is produced in an electroluminescent panel by excitation of special phosphors by placing the phosphor materials between two electrically conductive plates as in an electrical capacitor and then applying an AC voltage across the plates. One of the two conductive plates must transmit light and is made of electrically-conductive translucent plastic while the second plate is usually thin aluminum foil. The two plates with the phosphor material between them are then sealed in plastic. The light from this electroluminescent source covers an entire surface; it is an area source rather than a point source and produces light directly with great uniformity.

An electroluminescent panel has many features that make it ideally suited as a light source in an optical transducer. Among these are two features that are unique: (1) it is area light source; and (2) it will not fail catastrophically. An electroluminescent panel is fundamentally a capacitor and will fail only when subjected to electrical conditions which cause any condenser to fail—high voltage or operation beyond design conditions. There are no filaments to fail, no gases to contaminate and no emissive material to be consumed. In addition, an electroluminescent panel consumes an extremely low amount of power, it gives off no heat, the brightness of its light is uniform, it can be operated in a wide range of frequency and voltage, changes in frequency and voltage can be used to vary its light output, it is operative in a wide range of ambient temperatures and it does not have superimposed spectral lines such as are found in mercury vapor or fluorescent lamps because there is no arc or glow discharge in an electroluminescent panel.

An object of this invention is to provide a simple compact, rugged device for measuring small angles and small linear distances.

Another object of this invention is to provide a device of moderate sensitivity for measuring small angles and linear changes in measuring.

Still another object of this invention is to provide a photoelectric transducer in which uniform and stable illumination is obtained directly without optics from an area light source.

A further object of this invention is to provide a photoelectric transducer which uses two photocells connected in a current balancing circuit and in which the electrical output is a function of the differential illuminance of the photocells resulting from occlusion of the extended area light source.

A still further object of the invention is to construct a photoelectric transducer in which an electroluminescent panel is the source of light.

According to this invention, the foregoing objects are accomplished by a device comprised of an electroluminescent light source, an operating vane, an adjustable mask, two photocells and two channel-bar-shaped members. The light source, the mask and the photocells are suported within a long shallow light-tight box formed by fastening together the two channel-bar-shaped members. One end of the box is sealed with a light-tight cover; the other end is shielded from ambient light but is open to permit insertion of an operating vane which is pivotally supported at one end by a shaft perpendicular to the plane of the vane. From the pivotal end of the vane, a calibrating arm projects in the same horizontal plane at a right angle to the vane. The two photocells are connected in a current balancing circuit and the electrical output of the transducer is a function of the differential illuminance of the photocells resulting from occlusion of the extended area electroluminescent light source. Consequently, a signal is generated when the operating vane shifts laterally. The outer boundaries of the photocells are shadowed with the adjustable mask to obtain a zero setting.

The invention will be described with reference to the accompanying drawing in which: FIGURE 1 is an exploded view of the transducer. FIGURE 2 is an end view of the assembled transducer. FIGURE 3 is a partial isometric view of the assembled transducer. FIGURE 4 is a view of the adjusting screw arrangement.

FIGURE 1 shows in an exploded view of the relationship among the electroluminescent light source 1, the operating vane 2, the adjustable mask 3, the photocells 4, the two channel-bar-shaped members 5 and 6, the pivot shaft 7 and the calibrating arm 8, while FIGURE 2 shows in an end view the relationship of the parts in an assembled transducer. The electroluminescent light source 1 is supported within and occupies almost the entire bottom surface in channel-bar-shaped member 5. The two photocells 4 are supported within channel-bar-shaped member 6 and are separated by insulating ridge 9. Except for insulating ridge 9, the photocells 4 occupy almost the entire bottom surface in channel-bar-shaped member 6. Channel-bar-shaped member 6 is provided in each corner with a pad 10 having a depth about equal to the thickness of adjustable mask 3 so that when member 5 is attached to member 6, a box-like structure, an end view and a partial side view of which are shown in FIGURES 2 and 3, having an opening 11 on each side is formed. Adjustable mask 3 fits through opening 11 with a tolerance that allows the mask to move laterally, yet close enough to exclude light. Operating vane 2 which is supported by pivot shaft 7 is inserted into one end of the box structure and positioned over adjustable mask 3 as shown in FIGURE 1. The end of the box structure into which operating vane 2 is inserted cannot be sealed but is shielded from ambient light; the other end of the box structure is sealed with a light-tight cover. Bearing block 16 supports adjusting screw 12 which engages threaded nut 13 secured to mask 3 (FIGURES 1 and 4) thus providing means for obtaining initial zero balance of the current output of the photocell circuit by adjusting the lateral position of mask 3. A groove 14 machined into adjusting screw 12 provides means for set screws 15 to prevent axial movement of adjusting screw 12. Although the described arrangement for laterally adjusting the position of mask 3 is preferred, it is obvious that there are numerous other arrangements that can be used to achieve the same result. Therefore, it is not intended to limit the scope of this invention to the above described arrangement.

The transducer is calibrated by means of the calibrating arm 8 and a microscope equipped with a filar micrometer ocular. With these arrangements the tangential displacement (which is substituted for arc length since angles of less than 0.5 degree are measured) of the calibrating arm 8 is measured as it moves in conjunction with the operating vane 2 about their common pivoting center. The distance from the pivoting center of the calibrating arm, which can be any reasonable length, to the fiducial mark at its circumferential end is carefully measured to the hundreth of a millimeter; this number is used to calculate the angular movement of the operating vane (arc length/radius). If the working distance of the calibrating arm 8 is 184.83 mm. no difficulty is experienced measuring $10^{-4}$ radians with the calibrating mechanism.

There is an excellent linear relationship between tangential displacement of the calibrating arm and electrical output of the transducer over a considerable angular range from $0-2.16 \times 10^{-2}$ radian, as shown in FIGURE 5. Since the geometry of the calibrating mechanism is such that an 18.5 micron tangential displacement of the calibrating arm is equal to $10^{-4}$ radians angular displacement of the operating vane, the 4 mm. maximum displacement shown in FIGURE 5 represents an angular movement that is over two hundred times greater than the arbitrary minimum of $10^{-4}$ radians.

A 0–40 volt, 0–0.5 ampere DC constant voltage/constant current power supply was used to adjust the light level of the electroluminescent panel. This power supply energized a 400 Hz. oscillator with a step-up output transformer. The regulated power supply effectively isolated the transducer from the power line transients.

This transducer was designed to be used in a torsion measuring apparatus. Its function as part of this apparatus was to detect the small degree of twist in a torsion bar with a very large torsional constant in comparison to the stiffness of the samples being tested. Table 1 was prepared from torsion measurement data on eight typical sample materials.

This transducer like most optical transducers has minimum spurious effects. Frictional, inertia and inductive effects are completely absent while capacitive effects can readily be controlled with good design. Its particular virtues are its simple ruggedness, compactness and ready adaptability, none of which detract from its precision and sensitivity. And although it is designed to measure small angles, it can readily be applied to measuring small distances. Also the $10^{-4}$ radians it will measure does not represent the ultimate capability of the fundamental design. If the light level of the electroluminescent panel is raised then a moiré pattern or light extinction can be employed to considerably enhance sensitivity. The moiré, of course, would be obtained with a fixed and movable grating and the light extinction with fixed and movable polarizing sheets. There is also the possibility of mechanically amplifying the vane motion. Mechanical dynamic variables in the sonic and supersonic range can be detected since the response time of a photovoltaic cell approaches $2 \times 10^{-5}$ seconds. Consequently, there are many uses for this transducer, including uses where vibratory motions are to be detected as in mechanical dynamic testing.

In illustrating the functionality of the present invention torsion was applied to the pivot shaft and measured by differential illuminance of the photocells resulting from occlusion of the extended area light source. However, the apparatus can measure any force, pressure, acceleration or motion that causes movement of the operating vane and is not limited to measurement of torsion.

TABLE 1.—COMPARISON OF OPTICAL TRANSDUCER VERSUS MANUAL INSTRUMENT PERFORMANCE BASED ON TORQUE MEASUREMENTS

| Test material | Transducer torque, gm.-cm./deg. | Manual Instrument gm.-cm./deg. | Difference, percent | Apparent torsional modulas,[1] p.s.i. |
|---|---|---|---|---|
| White glove leather | 2.085 | 2.184 | 4.6 | 500 |
| Side leather | 5.530 | 5.390 | 2.6 | 800 |
| Black glove leather | 1.110 | 1.073 | 3.4 | 820 |
| Acrylic rubber | 16.65 | 16.80 | 0.9 | 1,400 |
| PVC, 35% DOP | 10.44 | 10.15 | 2.9 | 3,500 |
| Gasket rubber | 23.58 | 23.45 | 0.6 | 4,400 |
| Polyethylene | 51.00 | 52.70 | 3.2 | 18,000 |
| Unplasticized PVC | 2,825 | 2,825 | 0.9 | 476,000 |

[1] Based on manual measurement.

I claim:
1. A device for measuring small angles and small linear distances comprising:
   (a) an electroluminescent light source supported within a channel-bar-shaped member,
   (b) two photocells supported within a second channel-bar-shaped member,
   (c) a mask having means for adjusting its position laterally, said mask supported within a long shallow light-tight box, said box being formed by the two channel-bar-shaped members,
   (d) a vane positioned to operate laterally between the light source and the photocells, said vane being pivotally supported at one end by a shaft perpendicular to the lateral plane in which the vane operates.
2. A photoelectric transducer comprising:
   (a) an extended area light source mounted within a channel-bar-shaped member,
   (b) two photocells mounted within a second channel-bar-shaped member,
   (c) a mask positioned between the area light source and the photocells said mask supported within a long shallow light-tight box, said box being formed by the two channel-bar-shaped members,
   (d) a pivotally supported vane operating laterally between the light source and the photocells.
3. The photoelectric transducer of claim 2 in which the extended area light source is an electroluminescent tape.

4. The photoelectric transducer of claim 2 in which the mask is laterally adjustable.

References Cited

UNITED STATES PATENTS

| | | | |
|---|---|---|---|
| 2,236,255 | 3/1941 | Young | 250—231 |
| 2,625,659 | 1/1953 | Mendelson | 250—232 X |
| 3,058,005 | 10/1962 | Hurvitz | 250—220 |
| 3,159,750 | 12/1964 | Kazan | 250—231 |

JAMES W. LAWRENCE, Primary Examiner

V. LAFRANCHI, Assistant Examiner

U.S. Cl. X.R.

250—220; 356—152